(12) United States Patent
Iijima

(10) Patent No.: US 11,644,439 B2
(45) Date of Patent: May 9, 2023

(54) MAGNETIC BODY INSPECTION APPARATUS

(71) Applicant: SHIMADZU CORPORATION, Kyoto (JP)

(72) Inventor: Kenji Iijima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 27 days.

(21) Appl. No.: 16/744,748

(22) Filed: Jan. 16, 2020

(65) Prior Publication Data

US 2021/0223206 A1    Jul. 22, 2021

(51) Int. Cl.
G01N 27/9013 (2021.01)
G01N 27/904 (2021.01)

(52) U.S. Cl.
CPC ......... G01N 27/902 (2013.01); G01N 27/904 (2013.01)

(58) Field of Classification Search
None
See application file for complete search history.

(56) References Cited

U.S. PATENT DOCUMENTS

| | | | |
|---|---|---|---|
| 9,995,714 B2* | 6/2018 | Silvo ................... | B61B 12/06 |
| 2013/0147471 A1* | 6/2013 | Weischedel ............ | G01N 27/83 |
| | | | 324/238 |
| 2016/0041236 A1* | 2/2016 | Nakayama ......... | G01R 33/0029 |
| | | | 324/239 |
| 2017/0023347 A1* | 1/2017 | Ouellette ........... | G01N 27/9013 |

FOREIGN PATENT DOCUMENTS

| | | |
|---|---|---|
| JP | 03-096855 A | 4/1991 |
| JP | 06-087861 U | 12/1994 |
| JP | 2000-199755 A | 7/2000 |
| JP | 2000-351575 A | 12/2000 |
| JP | 2003302379 A | 10/2003 |
| JP | 2004105240 A | 4/2004 |
| JP | 2005-338046 A | 12/2005 |
| JP | 2017-003574 A | 1/2017 |

OTHER PUBLICATIONS

Kolbenschlag, Stefan; Linear drive unit and method for operating the same; Published Apr. 12, 2007; Samson AGFrankfurt; DE 10258279 B4; H01F 7/1607; H02K 33/12 (Year: 2007).*

(Continued)

*Primary Examiner* — Nasima Monsur

(74) *Attorney, Agent, or Firm* — Sughrue Mion, PLLC

(57) ABSTRACT

A magnetic body inspection apparatus includes a magnetic field application unit configured to apply a magnetic field to a long material including a magnetic body to be inspected, a detector configured to excite, in a longitudinal direction of the long material, magnetization of the magnetic body, the detector being configured to acquire a detection signal based on the magnetic field of the magnetic body that has been excited, and a detection apparatus body including the magnetic field application unit and the detector, the detection apparatus body being configured to be attachable to the long material in a short-side direction of the long material.

8 Claims, 10 Drawing Sheets

(56) References Cited

OTHER PUBLICATIONS

Fujisaki Keisuke et al; Flaw Detector for Conductor; JP H08105860 A; Date Published Apr. 23, 1996; CPC: G01N27/83 (Year: 1996).*
Yamanaka Yusuke; Position Detector; Date Published Sep. 8, 2014; JP 2014163726 A; ; G01D5/20 (Year: 2014).*
Notice of Reasons for Refusal dated Aug. 18, 2020 from the Japanese Patent Office in Application No. 2017-134537.
"Systematic investigation of the development of wire rope technology", National Museum of Nature and Science, Kitakyushu Industrial Technology Aggregation & Preservation Center, Report on Systematic Investigation of Technology Joint research edition, vol. 5, Mar. 31, 2012,(7 pages total).
"Wire Rope Tester MF-550", Tokyo Rope Mfg. Co., Ltd, known prior art (6 pages total).

* cited by examiner

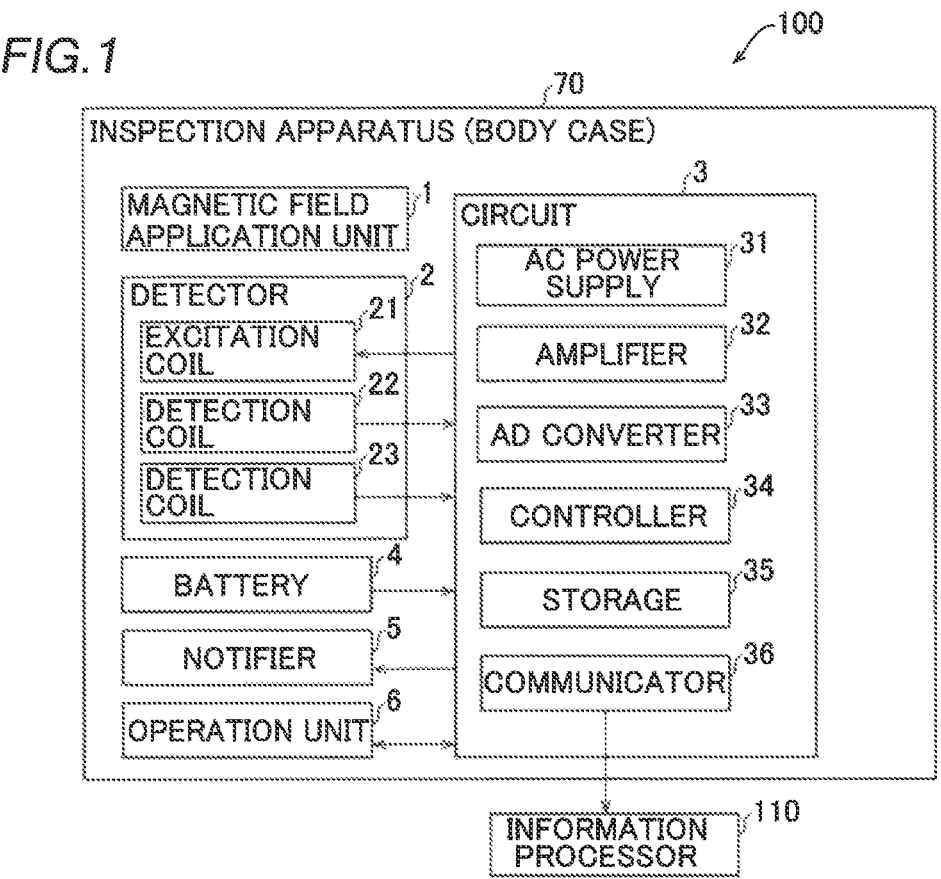
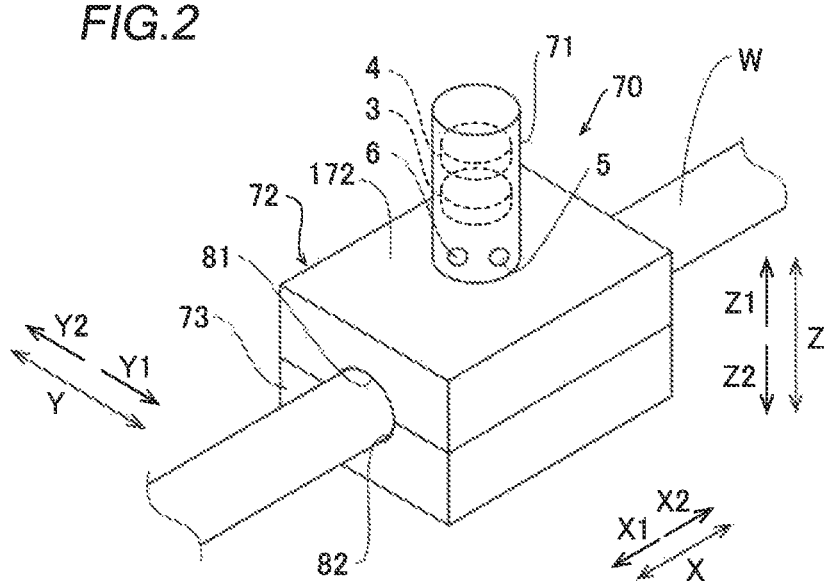

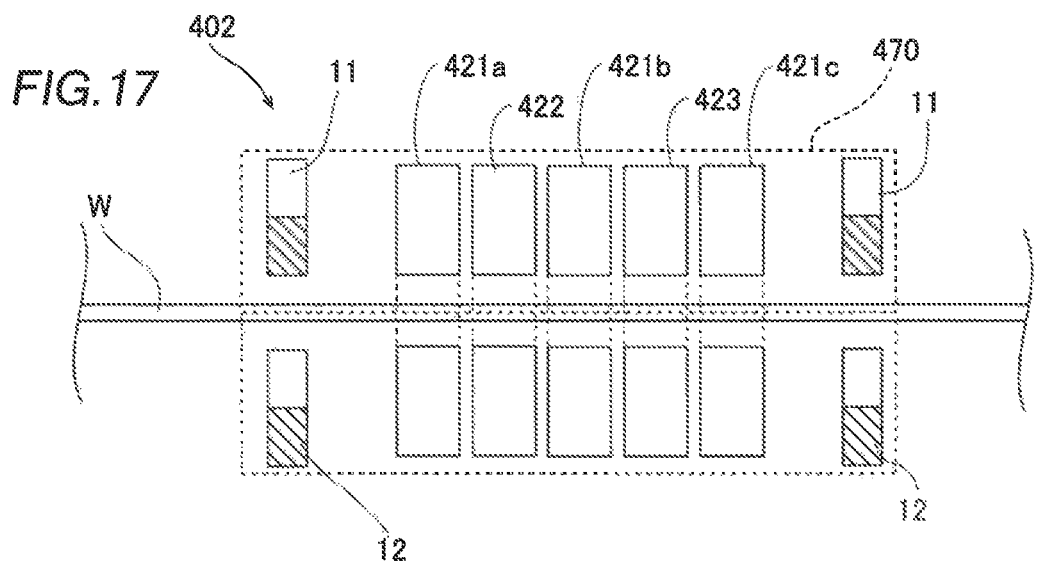

MAGNETIC BODY INSPECTION APPARATUS

CROSS-REFERENCE TO RELATED APPLICATIONS

The related application number JP2017-134537, Magnetic Body Inspection Apparatus, Jul. 10, 2017, Kenji Iijima, upon which this patent application is based, is hereby incorporated by reference.

BACKGROUND OF THE INVENTION

Field of the Invention

The present invention relates to a magnetic body inspection apparatus, and more particularly, it relates to a magnetic body inspection apparatus including a detector that detects the magnetic field of a magnetic body.

Description of the Background Art

Conventionally, a magnetic body inspection apparatus including a detector that detects the magnetic field of a magnetic body is known. Such a magnetic body inspection apparatus is disclosed in Japanese Patent Laid-Open No. 2003-302379, for example.

Japanese Patent Laid-Open No. 2003-302379 discloses an eddy-current testing apparatus including a detection coil that detects the magnetic field of a steel bar made of a magnetic body. This eddy-current testing apparatus includes an exciting coil that applies a magnetic field to the steel bar in the longitudinal direction of the steel bar and the detection coil that detects an induced electromotive force in the longitudinal direction of the steel bar to which the magnetic field is applied. This eddy-current testing apparatus is fixed to a steel bar conveying line, and while moving the steel bar in the longitudinal direction of the steel bar, the eddy-current testing apparatus applies a magnetic field to the steel bar by the exciting coil, and detects, by the detection coil, leakage of the magnetic field generated at a position at which the steel bar is broken. Furthermore, the eddy-current testing apparatus is configured to warn of the breakage of the steel bar based on a detected signal.

Generally, the magnitude and direction of magnetization inside a magnetic body of a steel bar or the like (long material) are not uniform. In particular, when a stress or bending, for example, is applied to a long material during use, the magnitude and direction of the magnetization inside the magnetic body change, and the magnetization becomes non-uniform. Consequently, in a conventional eddy-current testing apparatus (magnetic body inspection apparatus) as disclosed in Japanese Patent Laid-Open No. 2003-302379, noise is disadvantageously generated due to the non-uniform magnetization of the magnetic body. In this case, a detection coil (detector) disadvantageously detects the generated noise.

SUMMARY OF THE INVENTION

The present invention is intended to solve the above problem. The present invention aims to provide a magnetic body inspection apparatus capable of reducing noise caused by the non-uniform magnetization of a magnetic body.

In order to attain the aforementioned object, a magnetic body inspection apparatus according to an aspect of the present invention includes a magnetic field application unit configured to apply, in a direction that intersects with a longitudinal direction of a long material, a magnetic field to the long material including a magnetic body to be inspected, a detector configured to excite, in the longitudinal direction of the long material, magnetization of the magnetic body to which the magnetic field is applied by the magnetic field application unit, the detector being configured to acquire a detection signal based on the magnetic field of the magnetic body that has been excited, and a detection apparatus body including the magnetic field application unit and the detector, the detection apparatus body being configured to be attachable to the long material in a short-side direction of the long material.

As described above, the magnetic body inspection apparatus according to this aspect of the present invention includes the magnetic field application unit configured to apply a magnetic field to the long material in the direction that intersects with the longitudinal direction of the long material, and the detector configured to excite, in the longitudinal direction of the long material, the magnetization of the magnetic body to which the magnetic field is applied by the magnetic field application unit, and acquire the detection signal based on the magnetic field of the excited magnetic body. Accordingly, the magnetization of the magnetic body can be adjusted in advance in the direction that intersects with the longitudinal direction of the long material by the magnetic field application unit. Furthermore, the direction that intersects with the longitudinal direction of the long material is a direction in which magnetization is hard to occur, and thus the magnetization is adjusted in a reduced state in a direction that intersects with a detection direction. Therefore, the magnetization of a portion of the magnetic body without a flaw or the like at which the magnetization is non-uniform can be made uniform in advance. Consequently, the magnetic field of the magnetic body can be excited in the longitudinal direction of the long material by the detector in a state in which the magnetization of the portion of the magnetic body without a flaw or the like is uniform, and thus a flaw or the like of the long material (magnetic body) can be detected in a state in which noise resulting from the non-uniform magnitude and direction of the magnetization of the magnetic body is reduced. In addition, the detection apparatus body provided with the detector and the magnetic field application unit is configured to be attachable to the long material in the short-side direction of the long material such that the detection apparatus body can be easily attached to a position of the long material to be inspected without arranging (inserting) the long material in the inspection apparatus from the longitudinal direction side (tip) of the long material. Thus, even when the long material is in use and both ends of the long material in the longitudinal direction are fixed to another apparatus or a building, for example, the detection apparatus body can be easily attached to the long material. Furthermore, the detection apparatus body can be easily attached to the long material in use (or after use) in which the magnetization is likely to be relatively non-uniform even in a portion without a flaw or the like, and thus the present invention in which the magnetic field application unit makes the non-uniform magnetization uniform is particularly effective.

In this specification, the "flaw or the like" of the magnetic body indicates a wider concept including portions in which a cross-sectional area change in a detection direction occurs due to rubbing, local wear, wire breakage, a dent, corrosion, a crack, breakage, etc. of the magnetic body (including one due to a void when a flaw or the like occurs inside the magnetic body), portions in which a permeability change occurs due to rust of the magnetic body, welding burn of the magnetic body, mixing of impurities into the magnetic body, composition change of the magnetic body, etc., and other non-uniform portions of the magnetic body. Furthermore, the "detection signal based on the magnetic field" includes a wider concept including a signal generated by a temporal change in the magnitude of the magnetic field detected by the detector due to relative movement of the magnetic body and the detector and a signal generated by a temporal change in the magnitude of the magnetic field due to a temporal change in the magnetic field applied to the magnetic body. In addition, the term "intersect" is not limited to being orthogonal, but includes intersecting diagonally.

In the aforementioned magnetic body inspection apparatus according to this aspect, the detection apparatus body preferably includes a first apparatus body arranged on a first side in the short-side direction of the long material and a second apparatus body arranged on a second side in the short-side direction of the long material, and is preferably configured to open, in the short-side direction of the long material, a long material placement portion in which the long material is arranged in a state in which the first apparatus body and the second apparatus body are separate from each other, and close, in the short-side direction of the long material, the long material placement portion in a state in which the first apparatus body and the second apparatus body are coupled to each other. Accordingly, the first apparatus body and the second apparatus body are separate from each other such that the long material can be easily arranged in the long material placement portion from the short-side direction side of the long material, and thus the detection apparatus body can be easily attached to the long material. When the detection apparatus body is attached to the long material, the first apparatus body and the second apparatus body are coupled to each other such that detachment of the detection apparatus body in the short-side direction of the long material from the long material can be significantly reduced or prevented.

In this case, the first apparatus body and the second apparatus body of the detection apparatus body are preferably configured to be separable from each other. Accordingly, the first apparatus body and the second apparatus body can be separate from each other, and thus the long material placement portion can be easily opened in the short-side direction of the long material. Furthermore, as compared with a case in which the first apparatus body and the second apparatus body are spaced apart from each other in a state in which a portion of the first apparatus body is fixed to a portion of the second apparatus body and the first apparatus body is not separate from the second apparatus body, a mechanism for fixing the portion is not required, and thus the configuration of the detection apparatus body can be simplified.

In the aforementioned magnetic body inspection apparatus including the first apparatus body and the second apparatus body, the detector preferably includes a first conductor wire arranged in the first apparatus body, and a second conductor wire arranged in the second apparatus body, and the detection apparatus body preferably includes a connector configured to disconnect the first conductor wire from the second conductor wire in a state in which the first apparatus body and the second apparatus body are separate from each other, the connector being configured to connect the first conductor wire to the second conductor wire in a state in which the first apparatus body and the second apparatus body are coupled to each other so as to form a coil loop centered on the long material placement portion. When the first conductor wire provided in the first apparatus body and the second conductor wire provided in the second apparatus body and separate from the first conductor wire individually detect detection signals without forming a coil loop, the first conductor wire and the second conductor wire are separate from each other, and thus the detection accuracy of the detection signals is reduced. On the other hand, in the present invention, the connector connects the first conductor wire to the second conductor wire so as to form the coil loop centered on the long material placement portion, and thus even when the first conductor wire is provided in the first apparatus body and the second conductor wire is provided in the second apparatus body, a decrease in the detection accuracy of the detection signal can be significantly reduced or prevented.

In the aforementioned magnetic body inspection apparatus including the first apparatus body and the second apparatus body, the magnetic field application unit preferably includes a first magnetic field application unit arranged in the first apparatus body and a second magnetic field application unit arranged in the second apparatus body. Accordingly, a magnetic field can be applied to the long material from opposite sides in the short-side direction of the long material by the first magnetic field application unit and the second magnetic field application unit, and thus the magnetization of the long material can be made more uniform as compared with a case in which a magnetic field is applied from only one side in the short-side direction of the long material.

In the aforementioned magnetic body inspection apparatus according to this aspect, the magnetic field application unit preferably includes a permanent magnet configured to apply a magnetic field in the direction that intersects with the longitudinal direction of the long material. Accordingly, unlike a case in which a magnetic field is applied by an electromagnet, it is not necessary to supply electric power to apply a magnetic field, and thus an increase in power consumption can be significantly reduced or prevented. Furthermore, it is not necessary to provide a structure for supplying electric power to the electromagnet, and thus the complex configuration of the detection apparatus body can be significantly reduced or prevented.

In the aforementioned magnetic body inspection apparatus according to this aspect, the detection apparatus body preferably includes a determiner configured to determine a state of the magnetic body based on the detection signal. Accordingly, in the detection apparatus body, the determination result of the state of the magnetic body can be acquired. That is, the determination result can be easily acquired without extracting the detection signal from the detection apparatus body to the outside.

In this case, the detection apparatus body preferably includes a notifier configured to notify a determination result of the determiner. Accordingly, an operator who operates the detection apparatus body can be notified of the determination result. Thus, the operator can recognize the determination result without using a device other than the detection apparatus body.

In the aforementioned magnetic body inspection apparatus according to this aspect, the detection apparatus body preferably includes a communicator configured to transmit the detection signal or a signal based on the detection signal to an external apparatus. Accordingly, the detection signal acquired by the detector arranged in the detection apparatus body or the signal based on the detection signal (determination result signal, for example) can be transmitted to the external apparatus, and thus the external apparatus can analyze a signal, for example, based on the detection signal or the signal based on the detection signal.

In the aforementioned magnetic body inspection apparatus according to this aspect, the detection apparatus body preferably includes a grip. Accordingly, the operator can easily grasp the detection apparatus body.

BRIEF DESCRIPTION OF THE DRAWINGS

FIG. 1 is a block diagram showing the configuration of a magnetic body inspection apparatus according to a first embodiment of the present invention.

FIG. 2 is a perspective view showing the configuration of the magnetic body inspection apparatus according to the first embodiment of the present invention.

FIG. 17 is a diagram schematically showing a detector according to a second modified example of the first and second embodiments of the present invention.

FIG. 18 is a perspective view showing a detector according to a third modified example of the first and second embodiments of the present invention.

DESCRIPTION OF THE PREFERRED EMBODIMENTS

Figure 3:
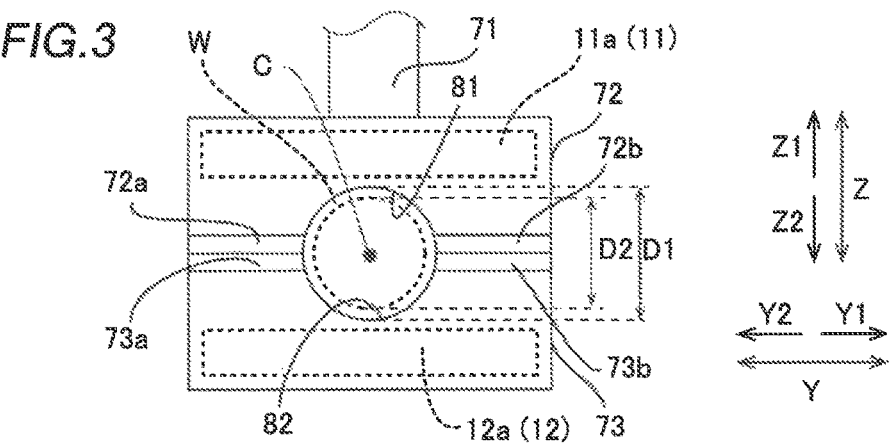
FIG. 3 is a diagram for illustrating a state in which a first case and a second case according to the first embodiment of the present invention are coupled to each other.

Embodiments embodying the present invention are hereinafter described on the basis of the drawings.

First Embodiment

The configuration of a magnetic body inspection apparatus 100 according to a first embodiment is now described with reference to FIGS. 1 to 9B. The inspection apparatus 100 is configured to detect the presence or absence of a flaw or a breakage in a steel wire rope W (hereinafter referred to as a "wire W") to be inspected, for example. The wire W is provided in a crane device, an elevator, a suspension bridge, a robot, etc., for example. The wire W is a magnetic body made of a rope-shaped long material formed by braiding (strand braiding, for example) a magnetic wire material (iron, for example) and that extends in an X direction. The wire W is an example of a "long material" in the claims.

(Configuration of Body Case)

As shown in FIG. 1, the inspection apparatus 100 includes a magnetic field application unit 1, a detector 2, a circuit 3, a battery 4, a notifier 5, and an operation unit 6. The magnetic field application unit 1, the detector 2, the circuit 3, the battery 4, the notifier 5, and the operation unit 6 are arranged in a body case 70. Furthermore, the body case 70 is configured as a housing of the inspection device 100, and each component of the inspection device 100 is housed inside the body case 70. The body case 70 is an example of a "detection apparatus body" in the claims.

In the following description, the "longitudinal direction of the wire W" refers to a direction in which the wire W extends, and is described as an X direction in FIG. 2. The "short-side direction of the wire W" refers to a direction along the cross-section of the wire W, and is described as a Y direction or a Z direction in FIG. 2. Furthermore, an "upward-downward direction" refers to the Z direction in FIG. 2 (the upward direction refers to an arrow Z1 direction, and the downward direction refers to an arrow Z2 direction), and a "right-left direction" refers to the Y direction in FIG. 2 (the right direction refers to an arrow Y1 direction, and the left direction refers to an arrow Y2 direction). A direction "along" the X direction (Y direction, Z direction) indicates that an angle defined by the X direction (Y direction, Z direction) is less than 45 degrees, for example.

As shown in FIG. 2, the body case 70 includes a grip 71, a first case 72, and a second case 73. The grip 71 has a columnar shape that extends in the arrow Z1 direction from a surface 172 of the first case 72 on the arrow Z1 direction side, for example. An operator holds the body case 70 (entire apparatus) while grasping the grip 71 with his or her hand. That is, the operator grasps the grip 71 such that the inspection apparatus 100 can be moved relative to the wire W. The circuit 3 and the battery 4 are housed inside the grip 71. Furthermore, the notifier 5 and the operation unit 6 are provided on the outer surface of the grip 71. The first case 72 is an example of a "first apparatus body" in the claims. The second case 73 is an example of a "second apparatus body" in the claims.

The notifier 5 includes a lamp, for example, and is configured to make an indication (be turned on or off, for example) in response to a command from the circuit 3 (controller 34) according to the inspection result (determination result) of the wire W. For example, the notifier 5 is arranged in a portion of the grip 71 on the first case 72 side. Thus, the indication is visually recognized by the operator who is grasping the grip 71.

The operation unit 6 includes a push button, for example, and is configured to receive an input operation from the operator who is grasping the grip 71. The operation unit 6 is configured to transmit the received input operation to the circuit 3.

Figure 4:
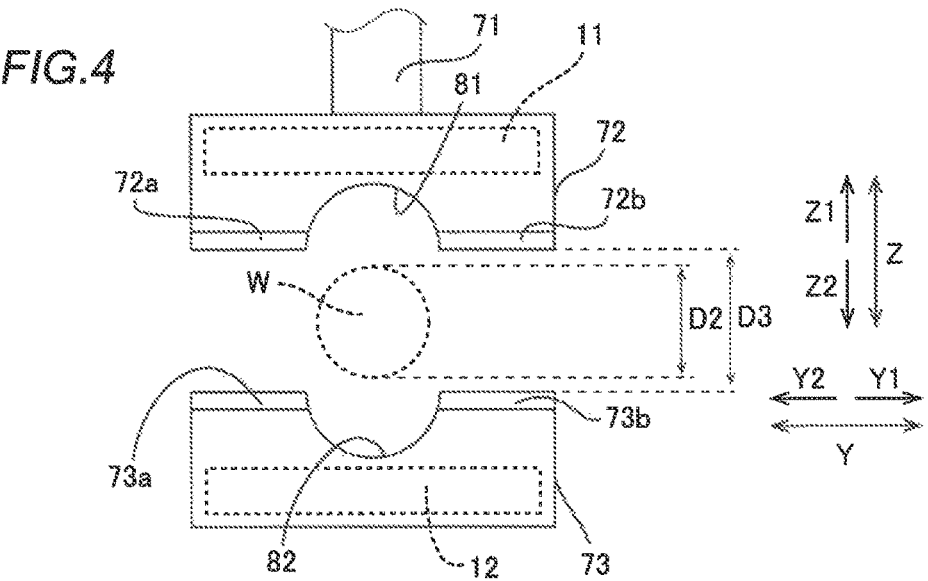
FIG. 4 is a diagram for illustrating a state in which the first case and the second case according to the first embodiment of the present invention are separate from each other.

As shown in FIGS. 3 and 4, in the first embodiment, the body case 70 is configured to be attachable to and detachable from the wire W in the short-side direction of the wire W. That is, the body case 70 is attachable to and is detachable from the wire W. Thus, the inspection apparatus 100 is not fixed at a predetermined position but can be carried by the operator. In other words, the inspection apparatus 100 is configured as a portable wire inspection apparatus.

As shown in FIG. 3, in the first embodiment, the first case 72 is arranged on a first side (arrow Z1 direction side) in the short-side direction of the wire W. The second case 73 is arranged on a second side (arrow Z2 direction side) in the short-side direction of the wire W. Furthermore, in the body case 70, recesses 81 and 82 in which the wire W is arranged are opened in the short-side direction (the Y direction or the Z direction) of the wire W in a state in which the first case 72 and the second case 73 are separate from each other (see FIG. 4), and the recesses 81 and 82 are closed in the short-side direction of the wire W in a state in which the first case 72 and the second case 73 are coupled to each other (see FIG. 3). That is, in the first embodiment, the body case 70 is configured such that the entire first case 72 and the entire second case 73 are separable from each other.

Specifically, each of the first case 72 and the second case 73 has a box shape. The box-shaped first case 72 and second case 73 are arranged adjacent to each other in the Z direction to form the body case 70. In the first embodiment, the body case 70 includes first connectors 72a and 72b provided in the first case 72 and second connectors 73a and 73b provided in the second case 73. As shown in FIG. 4, the body case 70 is separable toward opposite sides (the arrow Z1 direction side and the arrow Z2 direction side) in the short-side direction of the wire W in a state in which the first connectors 72a and 72b are disengaged from the second connectors 73a and 73b (open state). The first connectors 72a and 72b and the second connectors 73a and 73b are examples of a "connector" in the claims.

More specifically, the first connector 72a is provided on a portion of the first case 72 on the arrow Y2 direction side relative to the recess 81 and the arrow Z2 direction side. The first connector 72b is provided on a portion of the first case 72 on the arrow Y1 direction side relative to the recess 81 and the arrow Z2 direction side. The second connector 73a is arranged so as to face the arrow Z2 direction side of the first connector 72a, and is provided on a portion of the second case 73 on the arrow Y2 direction side relative to the recess 82 and the arrow Z1 direction side. The second connector 73b is arranged so as to face the arrow Z2 direction side of the first connector 72b, and is provided on a portion of the second case 73 on the arrow Y1 direction side relative to the recess 82 and the arrow Z1 direction side.

As shown in FIG. 3, in a state in which the first case 72 and the second case 73 are combined, the first connector 72a and the second connector 73a engage with each other, and the first connector 72b and the second connector 73b engage with each other. As shown in FIG. 4, in the body case 70, when the first case 72 and the second case 73 are separate from each other, the first connector 72a and the second connector 73a are disengaged from each other, and the first connector 72b and the second connector 73b are disengaged from each other.

The recess 81 has a semi-arcuate shape that is recessed in the arrow Z1 direction on the second case 73 side (arrow Z2 direction side) of the first case 72 and in the vicinity of a central portion of the first case 72 in the right-left direction (Y direction). The recess 82 has a semi-arcuate shape that is recessed in the arrow Z2 direction on the first case 72 side (arrow Z1 direction side) of the second case 73 and in the vicinity of a central portion of the second case 73 in the right-left direction (Y direction). Thus, the body case 70 is configured such that the wire W is arranged in a space formed by the recesses 81 and 82. That is, the body case 70 has a tubular shape that extends in the longitudinal direction of the wire W in a state in which the first case 72 and the second case 73 are coupled to each other. As shown in FIG. 3, the inner diameter D1 of the recesses 81 and 82 is larger than the diameter D2 of the wire W in a cross-sectional direction.

As shown in FIG. 4, in the inspection apparatus 100, in a state in which the first case 72 and the second case 73 are separate from each other, a distanced D3 between the first connector 72a (or 72b) and the second connector 73a (or 73b) is made larger than the diameter D2 of the wire W, and the body case 70 is moved in the arrow Y1 direction or the arrow Y2 direction from the wire W such that the body case 70 can be removed from the wire W.

Figure 5:
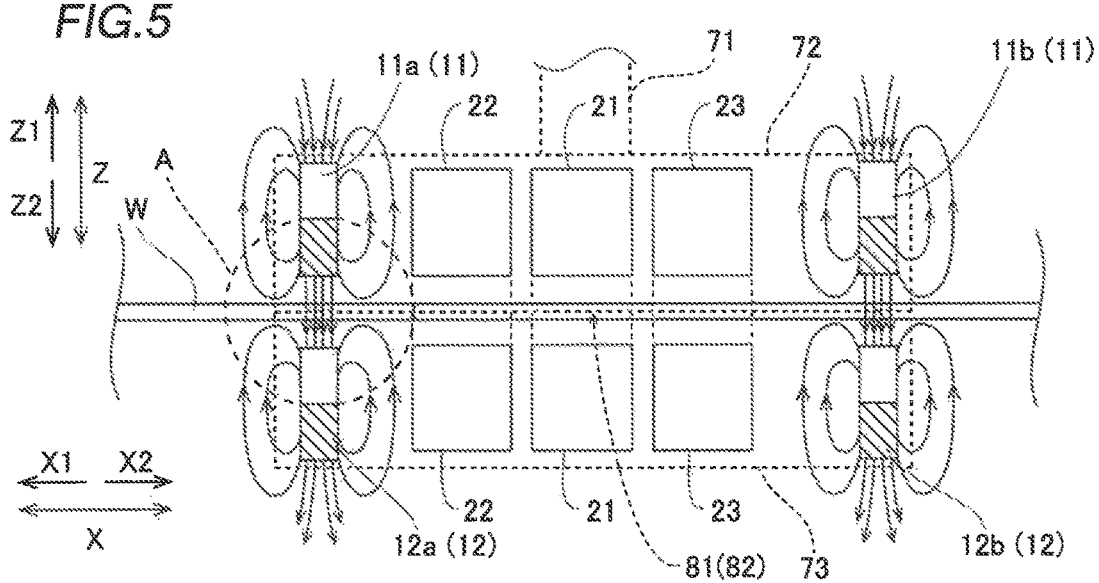
FIG. 5 is a schematic view for illustrating a magnetic field generated by a magnetic field application unit according to the first embodiment of the present invention.

As shown in FIGS. 2 and 5, the inspection apparatus 100 is configured to be movable in the longitudinal direction of the wire W with respect to the wire W in a state in which the grip 71 is grasped by the operator. That is, the inspection apparatus 100 is configured to be slidable along the wire W in a state in which the wire W is arranged in the recesses 81 and 82.

(Configuration of Magnetic Field Application Unit)

As shown in FIG. 5, in the first embodiment, the magnetic field application unit 1 includes a first magnetic field application unit 11 arranged in the first case 72 and a second magnetic field application unit 12 arranged in the second case 73. Specifically, the first magnetic field application unit 11 is arranged on the arrow Z1 direction side of the wire W relative to the recess 81. The second magnetic field application unit 12 is arranged on the arrow Z2 direction side of the wire W relative to the recess 82. In the first embodiment, the first magnetic field application unit 11 and the second magnetic field application unit 12 are configured to apply a magnetic field in a direction (the Z direction, for example) that intersects with the longitudinal direction of the wire W.

For example, the first magnetic field application unit 11 includes a first permanent magnet 11*a* arranged in a portion of the first case 72 on the arrow X1 direction side relative to the detector 2 and a second permanent magnet 11*b* arranged in a portion of the first case 72 on the arrow X2 direction side relative to the detector 2. The second magnetic field application unit 12 includes a third permanent magnet 12*a* arranged in a portion of the second case 73 on the arrow X1 direction side relative to the detector 2 and a fourth permanent magnet 12*b* arranged in a portion of the second case 73 on the arrow X2 direction side relative to the detector 2.

The first permanent magnet 11*a* and the second permanent magnet 11*b* are arranged such that the directions of the generated magnetic fields are the same. The third permanent magnet 12*a* and the fourth permanent magnet 12*b* are arranged such that the directions of the generated magnetic fields are the same. Furthermore, the first permanent magnet 11*a* and the third permanent magnet 12*a* are arranged such that the directions of the generated magnetic fields are substantially the same. The second permanent magnet 11*b* and the fourth permanent magnet 12*b* are arranged such that the directions of the generated magnetic fields are substantially the same.

Thus, the first permanent magnet 11*a*, the second permanent magnet 11*b*, the third permanent magnet 12*a*, and the fourth permanent magnet 12*b* are arranged such that the directions of the applied magnetic fields are the Z direction inside the recesses 81 and 82. For example, in FIG. 5, the magnetic field application unit 1 is illustrated with shaded portions as the N pole and unshaded portions as the S pole.

Accordingly, the first magnetic field application unit 11 and the second magnetic field application unit 12 apply magnetic fields in the Z direction inside the recesses 81 and 82. The first permanent magnet 11*a* and the third permanent magnet 12*a* apply magnetic fields in the arrow Z2 direction inside the recesses 81 and 82. The second permanent magnet 11*b* and the fourth permanent magnet 12*b* apply magnetic fields in the arrow Z1 direction inside the recesses 81 and 82. Furthermore, the magnitudes of the magnetic fields applied by the first magnetic field application unit 11 and the second magnetic field application unit 12 are set to be larger than the magnitude of a magnetic field applied by an excitation coil 21 described below.

Figure 6:
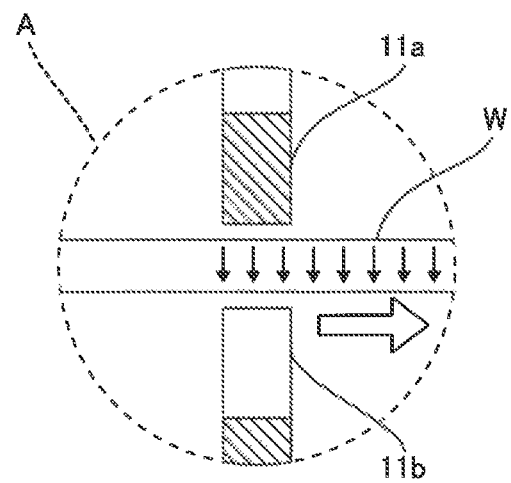
FIG. 6 is a schematic view a state in which the magnitude and direction of the magnetization of a wire are adjusted by the magnetic field application unit according to the first embodiment of the present invention.

As shown in FIG. 6, when a magnetic field is applied to the wire W arranged in the recesses 81 and 82, the magnetization of the wire W is adjusted in the directions of the magnetic fields applied by the first magnetic field application unit 11 and the second magnetic field application unit 12. Furthermore, when the body case 70 is moved with respect to the wire W, the magnetization of the wire W that passes between the first magnetic field application unit 11 and the second magnetic field application unit 12 is adjusted substantially in the short-side direction (Z direction) of the wire W. As shown in FIG. 5, the first magnetic field application unit 11 and the second magnetic field application unit 12 are respectively arranged on the opposite sides of the detector 2 in the X direction such that the magnetization of the wire W can be adjusted in advance even when the body case 70 is moved in any X direction.

The direction of the magnetic field (magnetic flux) by the first permanent magnet 11*a* and the direction of the magnetic field by the second permanent magnet 11*b* are the short-side direction of the wire W, and thus the magnitude of the magnetization itself becomes small. That is, it becomes possible to reduce the residual magnetization of the wire W after inspection.

(Configuration of Detector)

As shown in FIGS. 7A to 9B, the detector 2 is configured to excite, in the longitudinal direction of the wire W, the magnetization of the wire W to which a magnetic field is applied by the magnetic field application unit 1, and acquire a detection signal based on the magnetic field of the wire W, the magnetization of which is excited.

Specifically, as shown in FIG. 5, the detector 2 includes the excitation coil 21 and detection coils 22 and 23. Furthermore, the excitation coil 21 and the detection coils 22 and 23 are wound a plurality of times along the longitudinal direction with a center C (see FIG. 8) of the recesses 81 and 82 as a central axis, and form coil loops including conductor wires formed to have a tubular shape along the X direction (longitudinal direction) in which the wire W extends. For example, the excitation coil 21 is arranged so as to be sandwiched by the detection coils 22 and 23 from opposite sides in the X direction.

Figure 7A:
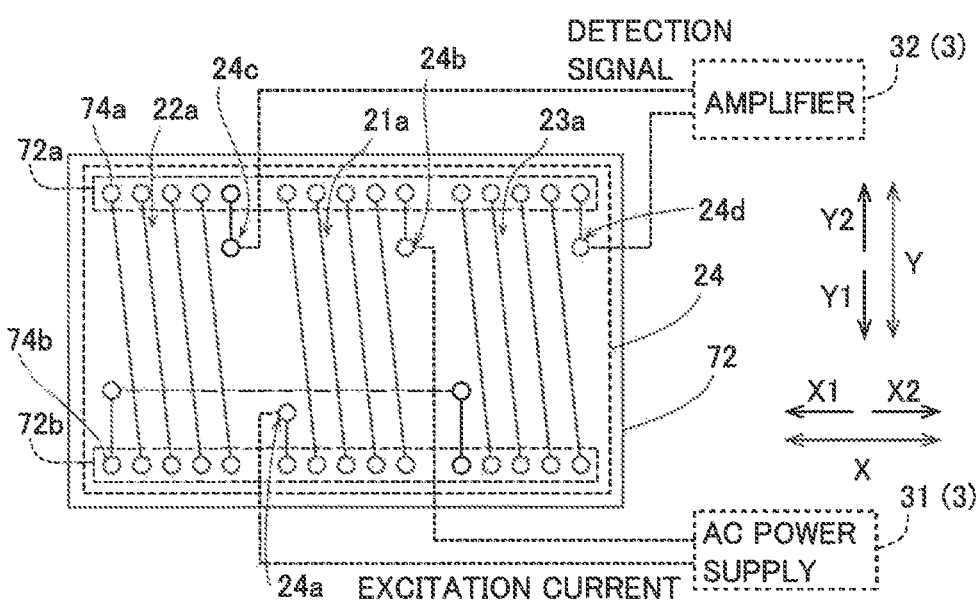
FIGS. 7A and 7B are plan views schematically showing the configuration of a detector according to the first embodiment of the present invention.
Figure 7B:
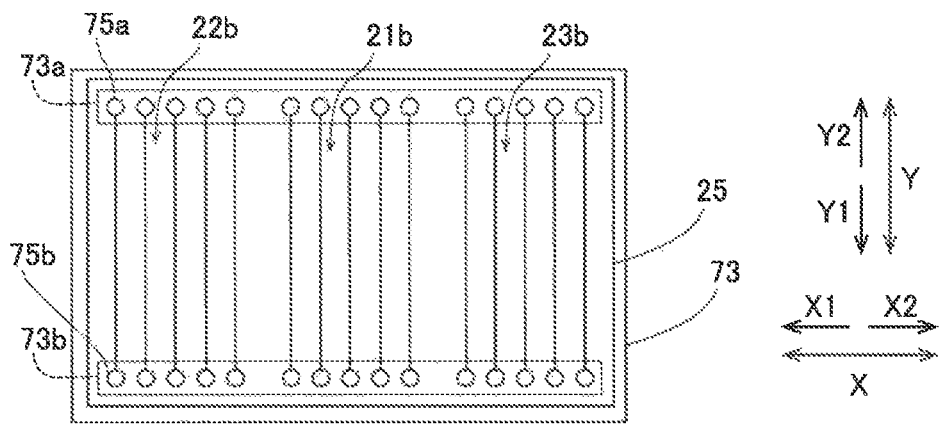

As shown in FIGS. 7A and 7B, the excitation coil 21 includes a first excitation conductor wire 21*a* arranged in the first case 72 and a second excitation conductor wire 21*b* arranged in the second case 73. The detection coil 22 includes a first detection conductor wire 22*a* arranged in the first case 72 and a second detection conductor wire 22*b* arranged in the second case 73. The detection coil 23 includes a third detection conductor wire 23*a* arranged in the first case 72 and a fourth detection conductor wire 23*b* arranged in the second case 73. The first excitation conductor wire 21*a*, the first detection conductor wire 22*a*, and the third detection conductor wire 23*a* are examples of a "first conductor wire" in the claims. The second excitation conductor wire 21*b*, the second detection conductor wire 22*b*, and the fourth detection conductor wire 23*b* are examples of a "second conductor wire" in the claims. In an example of FIGS. 7A and 7B, each coil is wound five times, but the number of windings is not limited to five.

Specifically, the first case 72 is provided with a first board 24. The second case 73 is provided with a second board 25. For example, the first board 24 and the second board 25 are arranged substantially parallel to an XY plane. The first excitation conductor wire 21*a*, the first detection conductor wire 22*a*, and the third detection conductor wire 23*a* are formed as a conductor pattern on the first board 24, for example. The second excitation conductor wire 21*b*, the second detection conductor wire 22*b*, and the fourth detection conductor wire 23*b* are formed as a conductor pattern on the second board 25, for example. The first board 24 and the second board 25 may be single-sided boards, double-sided boards, or multi-layer boards.

In the first embodiment, the first connectors 72*a* and 72*b* and the second connectors 73*a* and 73*b* are configured to disconnect the first excitation conductor wire 21*a* from the second excitation conductor wire 21*b*, disconnect the first detection conductor wire 22*a* from the second detection conductor wire 22*b*, and disconnect the third detection conductor wire 23*a* from the fourth detection conductor wire 23*b* in a state in which the first case 72 and the second case 73 are separate from each other.

Figure 8:
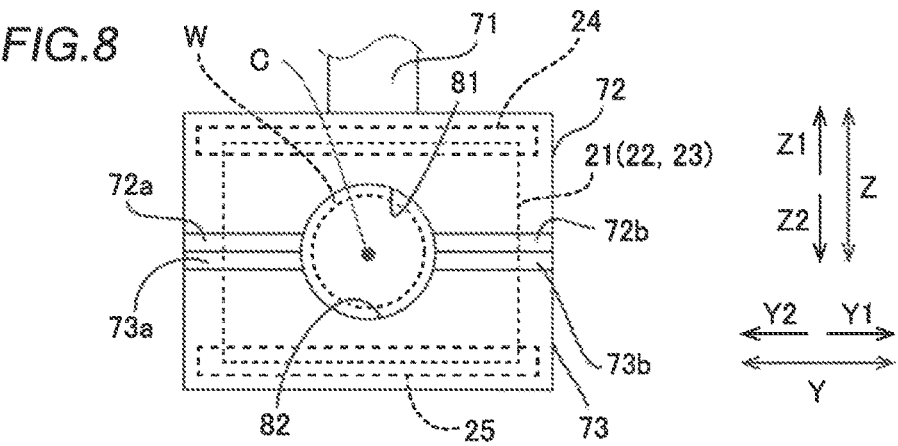
FIG. 8 is a sectional view schematically showing the configuration of the detector according to the first embodiment of the present invention.

As shown in FIG. 8, in the first embodiment, the first connectors 72*a* and 72*b* and the second connectors 73*a* and 73*b* are configured to connect the first excitation conductor wire 21*a* to the second excitation conductor wire 21*b*, connect the first detection conductor wire 22*a* to the second detection conductor wire 22*b*, and connect the third detection conductor wire 23*a* to the fourth detection conductor wire 23*b* in a state in which the first case 72 and the second case 73 are coupled to each other so as to form coil loops around the center C of the recesses 81 and 82.

Specifically, as shown in FIG. 7A, the first connector 72a is provided with first terminals 74a. The first connector 72b is provided with second terminals 74b. As shown in FIG. 7B, the second connector 73a is provided with third terminals 75a. The second connector 73b is provided with fourth terminals 75b.

The first terminals 74a and the second terminals 74b are connected to the conductor pattern of the first board 24, and the third terminals 75a and the fourth terminals 75b are connected to the conductor pattern of the second board 25. For example, the conductor pattern that forms the first excitation conductor wire 21a, the first detection conductor wire 22a, and the third detection conductor wire 23a has a linear shape inclined in the arrow X1 direction from a direction parallel to a Y-axis between the first terminals 74a and the second terminals 74b. The conductor pattern that forms the second excitation conductor wire 21b, the second detection conductor wire 22b, and the fourth detection conductor wire 23b has a linear shape in a direction along the Y direction between the third terminals 75a and the fourth terminals 75b. Furthermore, one end of the first detection conductor wire 22a and one end of the third detection conductor wire 23a are connected to each other on (inside) the first board 24.

The circuit 3 is connected to each of connectors 24a, 24b, 24c, and 24d of the first board 24. Specifically, an AC power supply 31 of the circuit 3 is configured to supply an alternating current (excitation current) to the excitation coil 21 via the connectors 24a and 24b. An amplifier 32 of the circuit 3 is configured to acquire detection signals (differential signals) of the detection coils 22 and 23 via the connectors 24c and 24d.

Figure 9A:
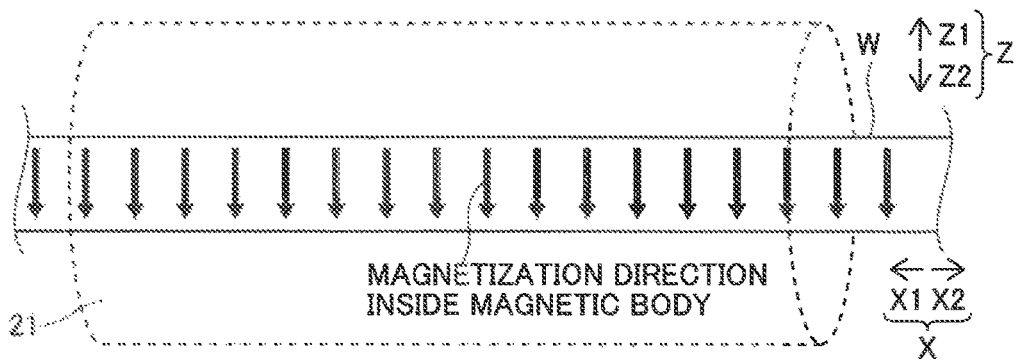
FIGS. 9A and 9B are diagrams for illustrating excitation by an excitation coil according to the first embodiment of the present invention.
Figure 9B:
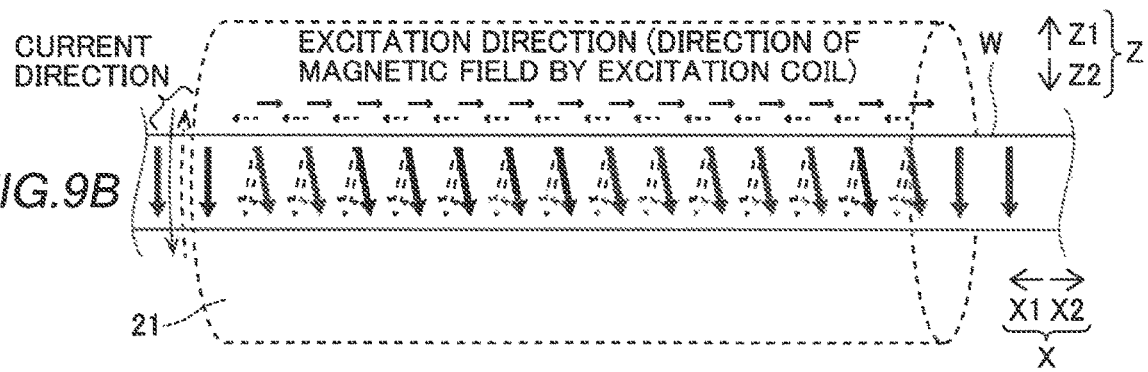

As shown in FIGS. 9A and 9B, when an excitation current flows through the excitation coil 21, a magnetic field generated based on the excitation current inside the excitation coil 21 is applied along the X direction. Thus, the excitation coil 21 excites the magnetization state of the wire W. Specifically, as shown in FIG. 9A, when no magnetic field is applied by the excitation coil 21 in a state in which the magnetization is adjusted in advance by the magnetic field application unit 1, the magnetization of the wire W is substantially aligned in the arrow Z2 direction in a portion without a flaw or the like. As shown in FIG. 9B, when an alternating current (excitation current) having a predetermined frequency flows from the AC power supply 31 into the excitation coil 21, a magnetic field is applied to vibrate in the X direction in which the wire W extends (such that a magnetic field in the arrow X1 direction and a magnetic field in the arrow X2 direction appear periodically). Furthermore, along with the time-varying direction (a solid line or a dotted line) of the excitation current that flows through the excitation coil 21, the direction of the magnetic field (a solid line or a dotted line) applied by the excitation coil 21 also changes.

Therefore, the magnetization of the wire W is excited by the time-varying magnetic field, and the magnetic field emitted from the wire W also changes over time. Consequently, the magnetic field in the same portion of the wire W changes over time without changing a relative position between the wire W and the detection coils 22 and 23, and thus the state of the wire W can be determined based on detection signals acquired by the detection coils 22 and 23 that detect a change in the magnetic field.

In the detection coils 22 and 23, voltages (signals) are generated due to a change in the magnetic field of the magnetic body of the wire W in the X direction by the excitation coil 21. The detection coils 22 and 23 are arranged on the opposite sides of the excitation coil 21 in the X direction to function as differential coils. Furthermore, the detection coils 22 and 23 output the detection signals (differential signals) to the amplifier 32.

(Configuration for Determining State of Magnetic Body)

As shown in FIG. 1, the circuit 3 includes the AC power supply 31, the amplifier 32, an AD (analog-digital) converter 33, the controller 34, a storage 35, and a communicator 36. The controller 34 is an example of a "determiner" in the claims.

The AC power supply 31 is configured to convert DC power from the battery 4 into AC power and supply the AC power to the excitation coil 21. The amplifier 32 is configured to amplify the detection signals (differential signals) from the detection coils 22 and 23 and output the detection signals to the AD converter 33. The AD converter 33 is configured to convert the detection signals (analog signals) input by the amplifier 32 into digital signals and output the digital signals to the controller 34.

The controller 34 includes a central processing unit (CPU), for example. For example, the controller 34 is configured to detect the detection signals output from the AD converter 33 in synchronization with the cycle of the excitation current. That is, the controller 34 is configured to perform a synchronous detection process on the detection signals (differential signals).

The controller 34 is configured to cause the notifier 5 to make an indication indicating a warning when the detected signals exceed a predetermined threshold. For example, the notifier 5 is configured to make an indication indicating a warning (notify the determination result) by turning on the lamp. That is, in the first embodiment, the controller 34 is configured to determine the state of the wire W based on the detection signals (detected signals). Furthermore, the controller 34 is configured to store a signal (determination result) indicating that the detected signals exceed the predetermined threshold in the storage 35.

The controller 34 is configured to transmit the signal (determination result signal) indicating that the detected signals exceed the predetermined threshold to an information processor 110, for example, via the communicator 36. For example, the communicator 36 is configured as a wireless communication circuit, and is configured to transmit a signal by wireless communication. Note that the predetermined threshold is not limited to one value, but a plurality of values may be provided. Furthermore, the determination result may include the contents indicating which threshold the detected signals exceed.

(Experimental Results)

Figure 10:
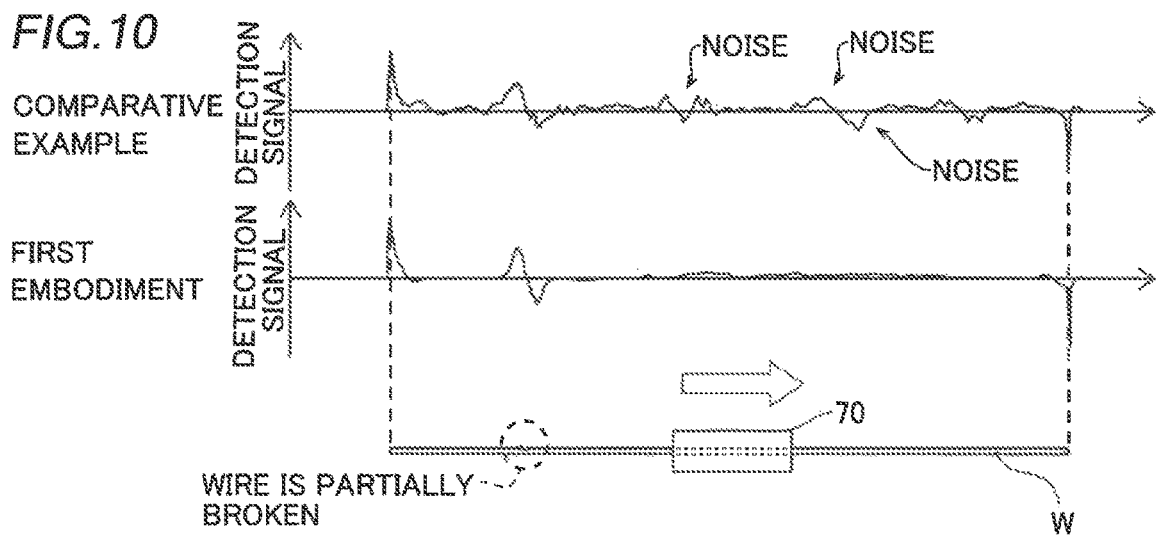
FIG. 10 is a diagram showing the experimental results of inspection apparatuses according to the first embodiment of the present invention and a comparative example.

Experimental results for verifying the effect of noise reduction due to homogenization (adjustment) of the magnetization of the magnetic body of the wire W in the direction that intersects with the longitudinal direction by the magnetic field application unit 1 of the inspection apparatus 100 according to the first embodiment are now described with reference to FIG. 10. Specifically, a comparison result between the inspection apparatus 100 according to the first embodiment and an inspection apparatus according to a comparative example is described.

As the inspection apparatus according to the comparative example, an apparatus obtained by removing the magnetic field application unit 1 from the inspection apparatus 100 according to the first embodiment was used. As shown in FIG. 10, in the measurement result of a detection signal of the inspection apparatus according to the comparative example, the detection signal became relatively large at a portion of the wire W with a breakage, and the detection signal (noise) also became large (noise portions in FIG. 10) sometimes at portions without a flaw or the like (portions other than a portion with a breakage). In this case, in the inspection apparatus according to the comparative example, an erroneous determination may be made due to a decrease in a signal-to-noise ratio.

On the other hand, in the measurement result of the detection signal of the inspection apparatus 100 according to the first embodiment, the detection signal became relatively large at a portion of the wire W with a breakage, but at portions without a flaw or the like (portions other than a portion with a breakage), the detection signal was smaller than that of the comparative example, and relatively large noise was not detected. Therefore, it has been found that in the inspection apparatus 100 according to the first embodiment, noise is reduced as compared with the inspection apparatus according to the comparative example.

From this result, it has been found that a magnetic field is applied in advance to the wire W in the short-side direction of the wire W by the magnetic field application unit 1 such that the non-uniform magnetization of the wire W can be uniform, and noise can be reduced.

Advantages of First Embodiment

According to the first embodiment, the following advantages are obtained.

According to the first embodiment, as described above, the magnetic body inspection apparatus 100 includes the magnetic field application unit 1 configured to apply a magnetic field to the wire W in the direction (Z direction) that intersects with the longitudinal direction of the wire W, and the detector 2 configured to excite, in the X direction, the magnetization of the wire W to which the magnetic field is applied by the magnetic field application unit 1, and acquire the detection signal based on the magnetic field of the excited magnetic body. Accordingly, the magnetization of the magnetic body can be adjusted in advance in a reduced state in the Z direction by the magnetic field application unit 1, and thus the magnetization of a portion of the magnetic body without a flaw or the like at which the magnitude and direction of the magnetization are non-uniform can be made uniform in advance. Consequently, the magnetic field of the wire W can be excited in the X direction by the detector 2 in a state in which the magnetization of the portion of the wire W without a flaw or the like is uniform, and thus a flaw or the like of the wire W (magnetic body) can be detected in a state in which noise resulting from the non-uniform magnitude and direction of the magnetization of the wire W is reduced. In addition, the body case 70 provided with the detector 2 and the magnetic field application unit 1 is configured to be attachable to the wire W in the short-side direction of the wire W such that the body case 70 can be easily attached to a position of the wire W to be inspected without arranging (inserting) the wire W in the inspection apparatus 100 from the longitudinal direction side (tip) of the wire W. Thus, even when the wire W is in use and both ends of the wire W in the longitudinal direction are fixed to another apparatus or a building, for example, the body case 70 can be easily attached to the wire W. Furthermore, the body case 70 can be easily attached to the wire W in use (or after use) in which the magnitude and direction of the magnetization are likely to be relatively non-uniform even in a portion without a flaw or the like, and thus the present invention in which the magnetic field application unit 1 reduces the non-uniform magnetization in the short-side direction of the wire W and then makes the magnetization uniform is particularly effective.

According to the first embodiment, as described above, the body case 70 includes the first case 72 arranged on the first side in the short-side direction of the wire W and the second case 73 arranged on the second side in the short-side direction of the wire W, and is configured to open, in the short-side direction of the wire W, the recesses 81 and 82 in which the wire W is arranged in a state in which the first case 72 and the second case 73 are separate from each other, and close, in the short-side direction of the wire W, the recesses 81 and 82 in a state in which the first case 72 and the second case 73 are coupled to each other. Accordingly, the first case 72 and the second case 73 are separate from each other such that the wire W can be easily arranged in the recesses 81 and 82 from the short-side direction side of the wire W, and thus the body case 70 can be easily attached to the wire W. When the body case 70 is attached to the wire W, the first case 72 and the second case 73 are coupled to each other such that detachment of the body case 70 in the short-side direction of the wire W from the wire W can be significantly reduced or prevented.

According to the first embodiment, as described above, the first case 72 and the second case 73 of the body case 70 are configured to be separable from each other. Accordingly, the first case 72 and the second case 73 can be separate from each other, and thus the recesses 81 and 82 can be easily opened in the short-side direction of the wire W. Furthermore, as compared with a case in which the first case and the second case are spaced apart from each other in a state in which a portion of the first case is fixed to a portion of the second case and the first case is not separate from the second case, a mechanism for fixing the portion is not required, and thus the configuration of the body case 70 can be simplified.

According to the first embodiment, as described above, the detector 2 includes the first excitation conductor wire 21a, the first detection conductor wire 22a, and the third detection conductor wire 23a ("first coil" in this paragraph) arranged in the first case 72, and the second excitation conductor wire 21b, the second detection conductor wire 22b, and the fourth detection conductor wire 23b ("second coil" in this paragraph) arranged in the second case 73. Furthermore, the body case 70 includes the first connectors 72a and 72b and the second connectors 73a and 73b configured to disconnect the first coil from the second coil in a state in which the first case 72 and the second case 73 are separate from each other, and connect the first coil to the second coil in a state in which the first case 72 and the second case 73 are coupled to each other so as to form the coil loops around the center C of the recesses 81 and 82. Accordingly, in the first embodiment, the first connectors 72a and 72b and the second connectors 73a and 73b connect the first coil to the second coil so as to form the coil loops around the center C of the recesses 81 and 82, and thus even when the first coil is provided in the first case 72 and the second coil is provided in the second case 73, a decrease in the detection accuracy of the detection signals can be significantly reduced or prevented.

According to the first embodiment, as described above, the magnetic field application unit 1 includes the first magnetic field application unit 11 arranged in the first case 72 and the second magnetic field application unit 12 arranged in the second case 73. Accordingly, a magnetic field can be applied to the wire W from opposite sides in the short-side direction of the wire W by the first magnetic field application unit 11 and the second magnetic field application unit 12, and thus the magnetization of the wire W can be made more uniform as compared with a case in which a magnetic field is applied from only one side in the short-side direction of the wire W.

According to the first embodiment, as described above, the magnetic field application unit 1 includes the first permanent magnet 11a, the second permanent magnet 11b, the third permanent magnet 12a, and the fourth permanent magnet 12b configured to apply a magnetic field in the direction that intersects with the longitudinal direction of the wire W. Accordingly, unlike a case in which a magnetic field is applied by an electromagnet, it is not necessary to supply electric power to apply a magnetic field, and thus an increase in power consumption can be significantly reduced or prevented. Furthermore, it is not necessary to provide a structure for supplying electric power to the electromagnet, and thus the complex configuration of the body case 70 can be significantly reduced or prevented.

According to the first embodiment, as described above, the body case 70 includes the controller 34 configured to determine the state of the magnetic body based on the detection signals. Accordingly, in the body case 70, the determination result of the state of the magnetic body can be acquired. That is, the determination result can be easily acquired without extracting the detection signals from the body case 70 to the outside.

According to the first embodiment, as described above, the body case 70 includes the notifier 5 configured to notify the determination result of the controller 34. Accordingly, the operator who operates the body case 70 can be notified of the determination result. Thus, the operator can recognize the determination result without using a device other than the body case 70.

According to the first embodiment, as described above, the body case 70 includes the communicator 36 configured to transmit the detection signals or the signal based on the detection signals to the information processor 110. Accordingly, the detection signals acquired by the detector 2 arranged in the body case 70 or the signal based on the detection signals (the detected signals or the determination result signal, for example) can be transmitted to the information processor 110, and thus the information processor 110 can analyze a signal, for example, based on the detection signals or the signal based on the detection signals.

According to the first embodiment, as described above, the body case 70 includes the grip 71. Accordingly, the operator can easily grasp the body case 70.

Second Embodiment

The configuration of an inspection apparatus 200 according to a second embodiment is now described with reference to FIGS. 11 to 14. The inspection apparatus 200 according to the second embodiment is configured to separate one side of a first case 272 from one side of a second case 273 with a hinge 270 as a support shaft unlike the first embodiment in which the entire first case 72 and the entire second case 73 are separable from each other. The same configurations as those of the inspection apparatus 100 according to the first embodiment are denoted by the same reference numerals, and description thereof is omitted.

Figure 11:
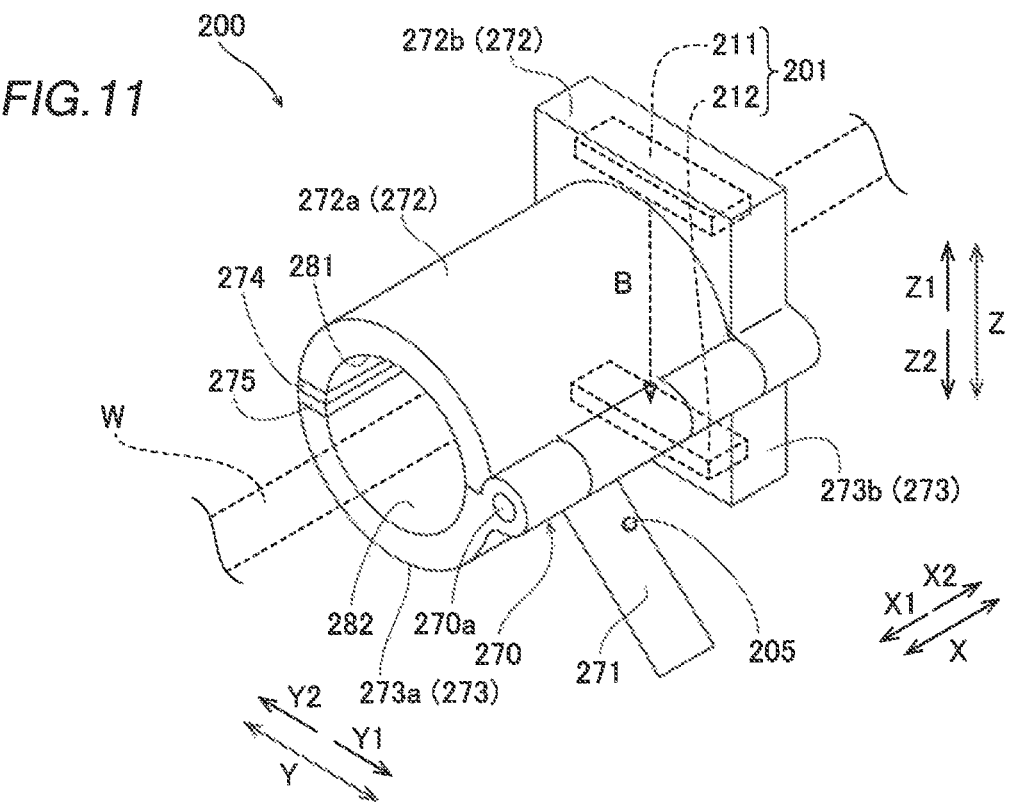
FIG. 11 is a perspective view showing an inspection apparatus according to a second embodiment of the present invention.

As shown in FIG. 11, the inspection apparatus 200 according to the second embodiment includes a magnetic field application unit 201, a notifier 205, a grip 271, the first case 272, and the second case 273. The magnetic field application unit 201 includes a first magnetic field application unit 211 arranged in a portion 272b of the first case 272 on the arrow X2 direction side and configured to apply a magnetic field in an arrow B direction (arrow Z2 direction), and a second magnetic field application unit 212 arranged in a portion 273b of the second case 273 on the arrow X2 direction side and configured to apply a magnetic field in the arrow B direction (arrow Z2 direction).

Figure 12:
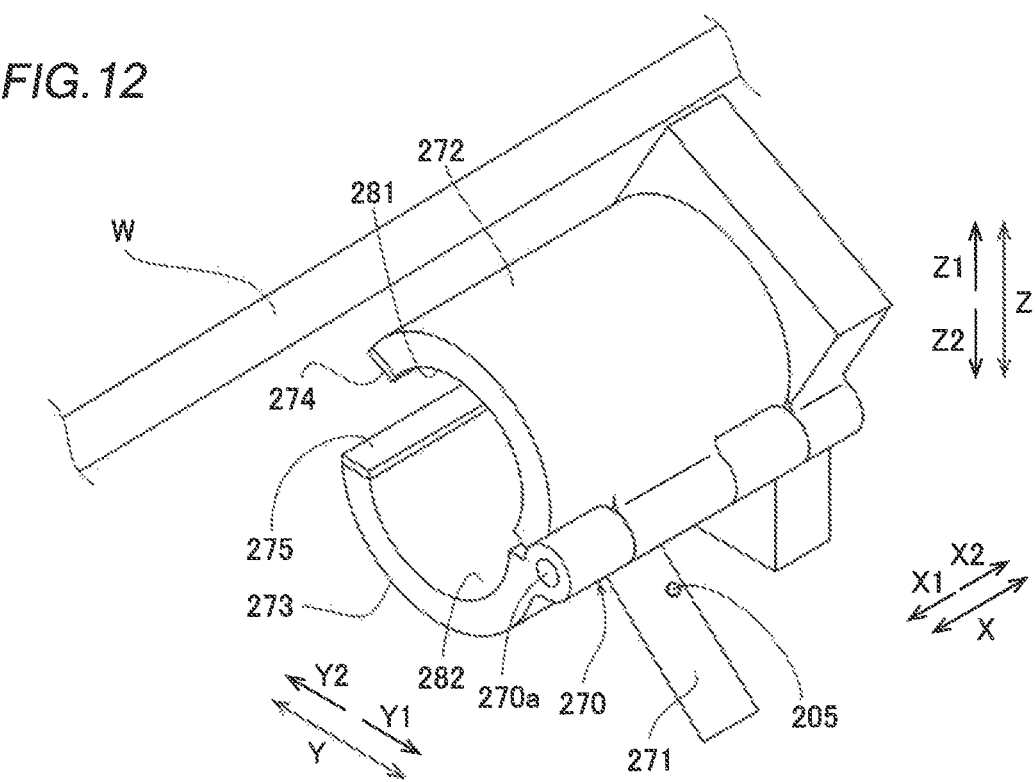
FIG. 12 is a perspective view showing a state in which a recess is opened in the inspection apparatus according to the second embodiment of the present invention.

The first case 272 and the second case 273 have a cylindrical shape that extends in an X direction in a state in which the same are coupled to each other. Portions of the first case 272 and the second case on the arrow Y1 direction side are connected to each other by the hinge 270. Thus, as shown in FIG. 12, the first case 272 and the second case 273 are configured to be relatively rotatable with a shaft 270a of the hinge 270 as a support shaft. For example, the first case 272 is rotated with respect to the second case 273 such that a first connector 274 of the first case 272 is disengaged from a second connector 275 of the second case 273, a space between the first connector portion 274 and the second connector portion 275 is opened, and a wire W can pass therethrough in a short-side direction (Y direction). As shown in FIG. 11, when the first connector 274 and the second connector 275 are engaged with each other, recesses 281 and 282 in which the wire W is arranged are closed.

Figure 13:
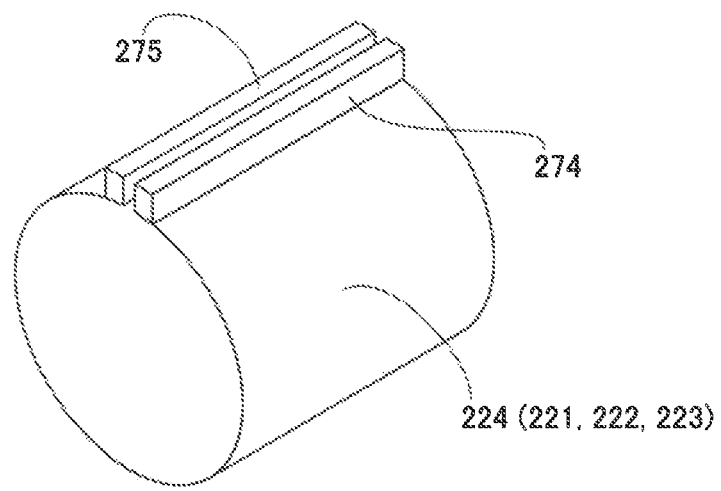
FIG. 13 is a perspective view showing a flexible printed board according to the second embodiment of the present invention.
Figure 14:
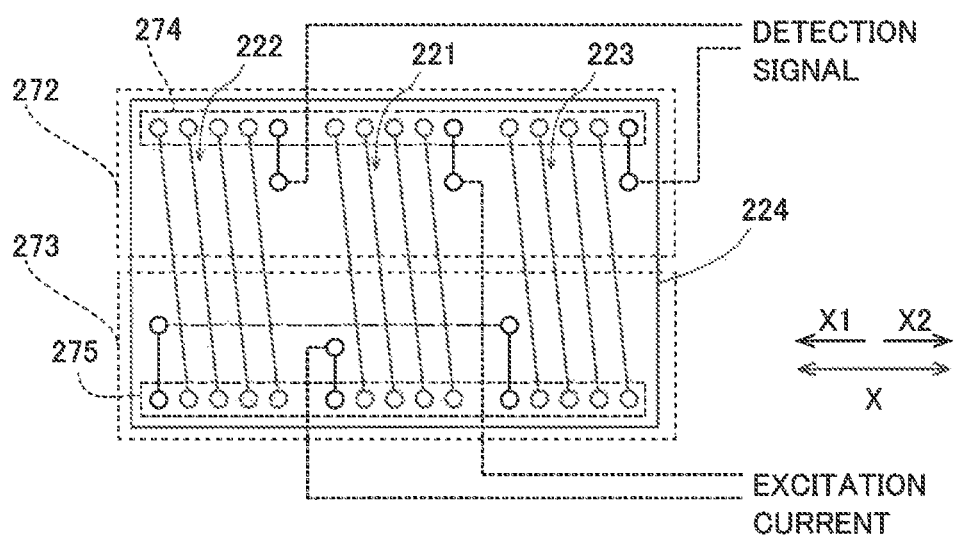
FIG. 14 is a development view showing the flexible printed board according to the second embodiment of the present invention.

As shown in FIGS. 13 and 14, the inspection apparatus 200 includes a flexible printed board 224 (hereinafter referred to as a "board 224") that is flexibly deformable and arranged over the first case 272 and the second case 273. The board 224 is provided with the first connector 274 and the second connector 275.

As shown in FIG. 14, the board 224 is provided with an excitation coil 221 and detection coils 222 and 223. As shown in FIG. 11, the first connector 274 and the second connector 275 engage with each other such that the excitation coil 221 and the detection coils 222 and 223 each form a coil loop. The remaining configurations of the second embodiment are similar to those of the first embodiment.

Advantages of Second Embodiment

According to the second embodiment, as described above, the first case 272 and the second case 273 are configured to be relatively rotatable with the shaft 270a of the hinge 270 as a support shaft. Accordingly, even when the recesses 281 and 282 are opened in the short-side direction of the wire W, the first case 272 and the second case 273 can be integrally carried, and thus convenience can be improved. The remaining advantages of the second embodiment are similar to those of the first embodiment.

Modified Examples

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the example in which the inspection apparatus is configured to inspect the wire as the long material has been shown in each of the aforementioned first and second embodiments, the present invention is not limited to this. For example, the inspection apparatus may be configured to inspect a thin plate, a square member, a cylindrical pipe, string-like metal, or a chain other than the wire as the long material.

While the example in which the magnetic field application unit is configured to apply magnetic fields in the direction that intersects with the longitudinal direction of the wire with the permanent magnets has been shown in each of the aforementioned first and second embodiments, the present invention is not limited to this. For example, the magnetic field application unit may be configured to apply magnetic fields in a direction that intersects with the longitudinal direction of the wire with electromagnets.

While the example in which the cylindrical grip is provided on the body case has been shown in each of the aforementioned first and second embodiments, the present invention is not limited to this. For example, a body case 370 according to a first modified example shown in FIGS. 15 and 16 is not provided with a cylindrical grip, and a first body 372, a second body 373, a first connector 374a or 374b, and a second connector 375a or 375b are configured to function as a grip.

While the example in which the wire is arranged in the semicircular recesses of the body case has been shown in each of the aforementioned first and second embodiments, the present invention is not limited to this. For example, as the body case 370 according to the first modified example shown in FIGS. 15 and 16, a wire W is arranged in rectangular recesses 381 and 382.

While the example in which the first case and the second case that house the board are provided has been shown in each of the aforementioned first and second embodiments, the present invention is not limited to this. For example, as shown in FIGS. 15 and 16, a board 324 (and the first connectors 374a and 374b) itself may be configured as the first body 372, and a board 325 (and the second connectors 375a and 375b) itself may be configured as the second body 373. In this case, the body case 370 according to the first modified example can be configured relatively easily (inexpensively), and thus it is suitable for mass production.

Figure 15:
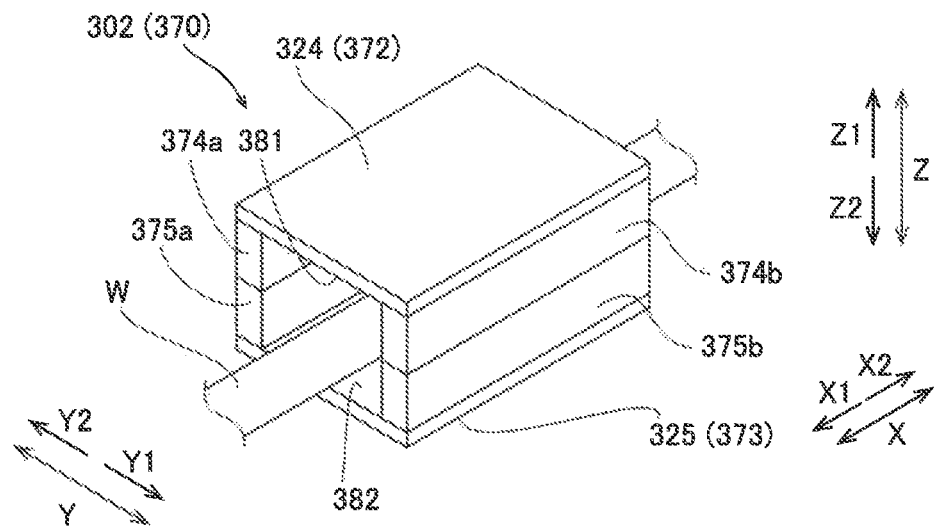
FIG. 15 is a perspective view showing a body case (detector) according to a first modified example of the first and second embodiments of the present invention.
Figure 16:
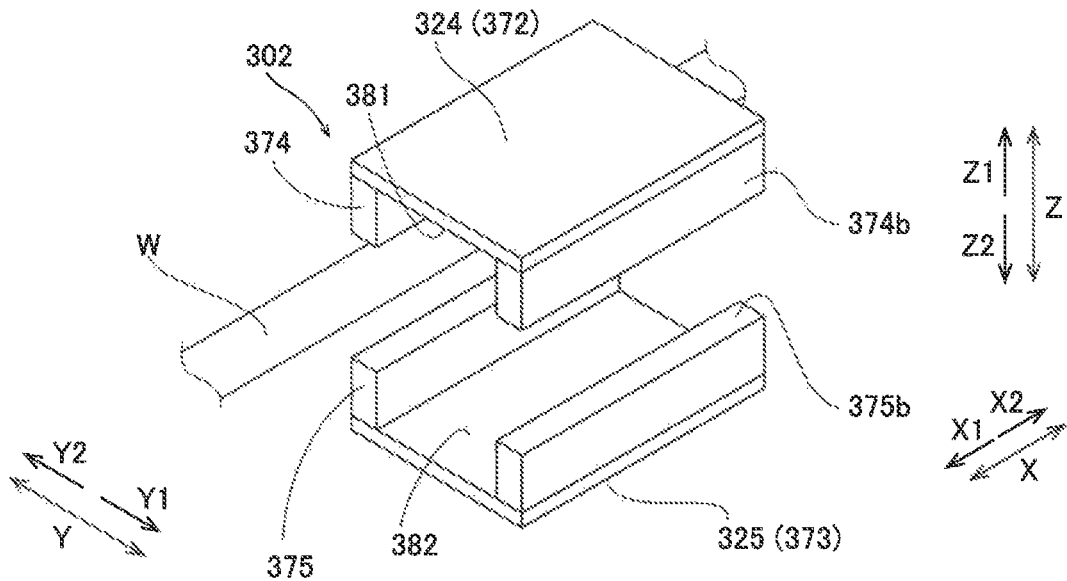
FIG. 16 is a perspective view showing a state in which a recess of the body case according to the first modified example of the first and second embodiments of the present invention is opened.

The body case 370 according to the first modified example shown in FIGS. 15 and 16 includes the boards 324 and 325 on which coils of a detector 2 are formed, the first connectors 374a and 374b provided on the board 324, and the second connectors 375a and 375b provided on the board 325. As shown in FIG. 15, the board 324 and the first connectors 374a and 374b are configured as the first body 372, and the board 325 and the second connectors 375a and 375b are configured as the second body 373. Furthermore, in a state in which the first body 372 and the second body 373 are coupled to each other, the first connectors 374a and 374b are connected to the second connectors 375a and 375b such that the coils of the detector 302 each form a coil loop. As shown in FIG. 16, the first body 372 and the second body 373 are separate from each other such that the wire W can pass through spaces between the first connectors 374a and 374b and the second connectors 375a and 375b.

While the example in which one excitation coil excites the magnetization of the wire W has been shown in each of the aforementioned first and second embodiments, the present invention is not limited to this. For example, like a detector 402 according to a second modified example shown in FIG. 17, the detector 402 is provided with excitation coils 421a, 421b, and 421c arranged in a body case 470, and detection coils 422 and 423. Furthermore, the excitation coil 421a, the detection coil 422, the excitation coil 421b, the detection coil 423, and the excitation coil 421c are arranged in this order along the longitudinal direction of a wire W.

While the example in which the detector is configured to form the coil loops using the first connectors and the second connectors has been shown in each of the aforementioned first and second embodiments, the present invention is not limited to this. For example, like a detector 502 according to a third modified example shown in FIGS. 18 to 20, first connectors and second connectors are not provided, and the detector 502 is provided with first excitation coils 521a and 522a, second excitation coils 521b and 522b, and detection coils 523a and 523b, each of which is saddle-shaped.

Figure 19:
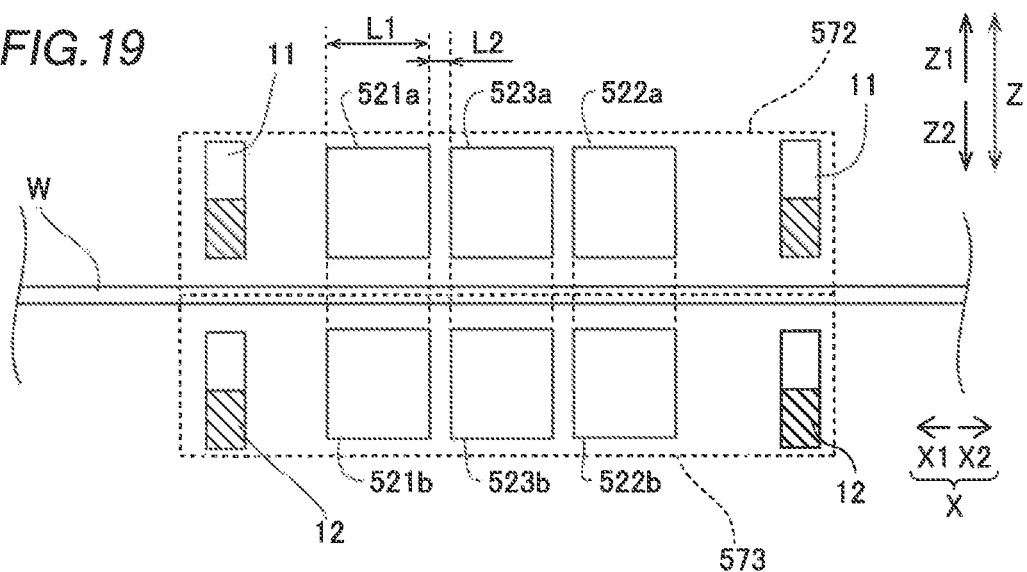
FIG. 19 is a diagram schematically showing the relationship between a distance between an excitation coil and a detection coil of the detector according to the third modified example of the first and second embodiments of the present invention and the length of the excitation coil.
Figure 20:
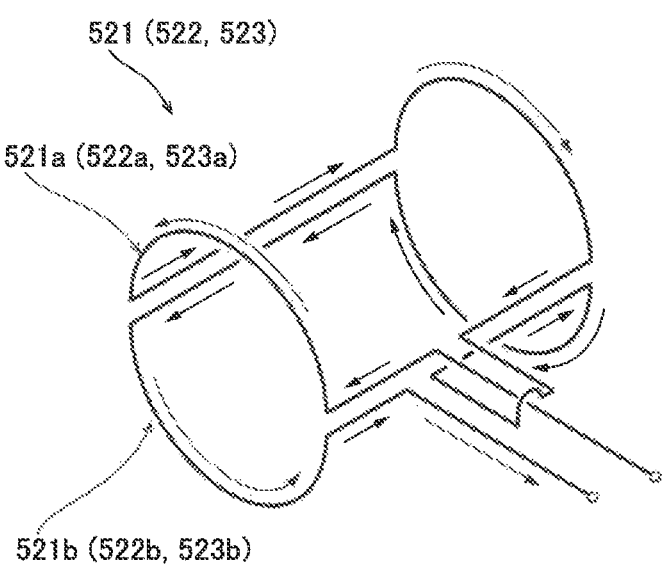
FIG. 20 is a perspective view showing the configurations of the excitation coil and the detection coil of the detector according to the third modified example of the first and second embodiments of the present invention.

As shown in FIGS. 18 to 20, the detector 502 according to the third modified example includes excitation coils 521 and 522 and a detection coil 523. Furthermore, as shown in FIGS. 18 and 19, the excitation coils 521 and 522 are arranged so as to sandwich the detection coil 523 from opposite sides in the longitudinal direction of a wire W. In addition, as shown in FIG. 19, the first excitation coils 521a and 522a and the first detection coil 523a are arranged in the first case 572 on the arrow Z1 direction side (a first side in the short-side direction of the wire W), and the second excitation coils 521b and 522b and the second detection coil 523b are arranged in the second case 573 on the arrow Z2 direction side (a second side in the short-side direction of the wire W).

As shown in FIGS. 18 and 20, in the saddle-shaped first excitation coil 521a and the saddle-shaped second excitation coil 521b, magnetic fields caused by a current that flows along the longitudinal direction of the wire W cancel each other. Similarly, in the saddle-shaped first excitation coil 522a and the saddle-shaped second excitation coil 522b, magnetic fields caused by the current that flows along the longitudinal direction of the wire W cancel each other. The magnetic fields caused by the current that flows in a loop shape in the short-side direction of the wire W in the vicinity of the detection coil 523 are in the same direction, and thus the excitation coil 521 and the excitation coil 522 function as one excitation coil.

As shown in FIG. 19, in an X direction, the length (size) L2 of a gap between the excitation coil 521 or 522 and the detection coil 523 is smaller than the length L1 of the excitation coil 521 or 522. Thus, the magnetic field in the detection coil 523 generated by the magnetic field generated in the vicinity of an end of the excitation coil 521 on the arrow X1 direction side can be reduced. The magnetic field generated in the vicinity of an end of the excitation coil 521 on the arrow X2 direction side is used as a magnetic field for excitation. Furthermore, the magnetic field in the detection coil 523 generated by the magnetic field generated in the vicinity of an end of the excitation coil 522 on the arrow X2 direction side can be reduced. The magnetic field generated in the vicinity of an end of the excitation coil 522 on the arrow X2 direction side is used as a magnetic field for excitation.

Figure 21:
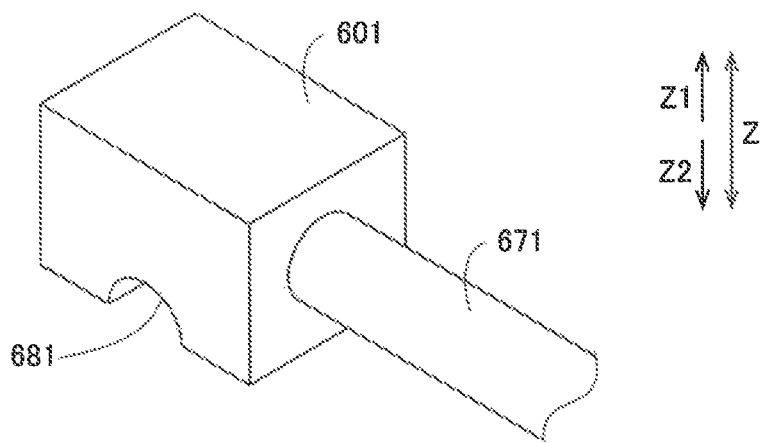
FIG. 21 is a perspective view showing the configuration of a magnetic field application unit according to a fourth modified example of the first and second embodiments of the present invention.

While the example in which the magnetic field application unit is arranged on each of the opposite sides of the wire in the short-side direction has been shown in each of the aforementioned first and second embodiments, the present invention is not limited to this. For example, like a magnetic field application unit 601 according to a fourth modified example shown in FIG. 21, it may be arranged only on one side (arrow Z1 direction side) of the wire W in the short-side direction. Specifically, the magnetic field application unit 601 is provided with a grip 671, and a recess 681 for arranging a wire W at an end of the magnetic field application unit 601 on the arrow Z2 direction side is provided. Alternatively, the body case may be configured such that the magnetic field application unit is arranged only in one of the first case and the second case.

While the example in which both the magnetic field application unit and the detector are integrally arranged (housed) in the body case has been shown in each of the aforementioned first and second embodiments, the present invention is not limited to this. That is, the magnetic field application unit and the detector may be arranged in different cases. For example, after the magnetic field application unit 601 shown in FIG. 21 applies a magnetic field to the wire W in advance, the detector 302 shown in FIG. 15 may detect detection signals.

Figure 22:
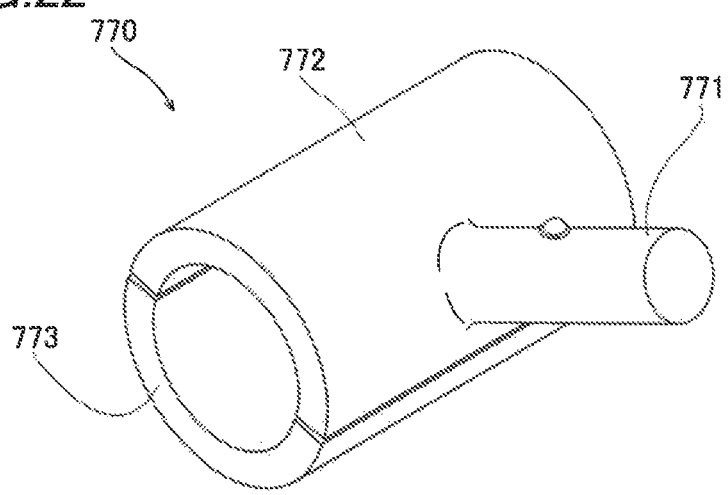
FIG. 22 is a perspective view showing the configuration of a body case according to a fifth modified example of the second embodiment of the present invention.

While the example in which the first case and the second case are configured to be relatively rotatable with the shaft of the hinge as a support shaft has been shown in the aforementioned second embodiment, the present invention is not limited to this. For example, like a body case 770 according to a fifth modified example shown in FIG. 22, a hinge may not be provided, and a first case 772 and a second case 773 may be configured to be separable from each other. In this case, for example, a grip 771 is arranged so as to be connected to the first case 772.

Figure 23:
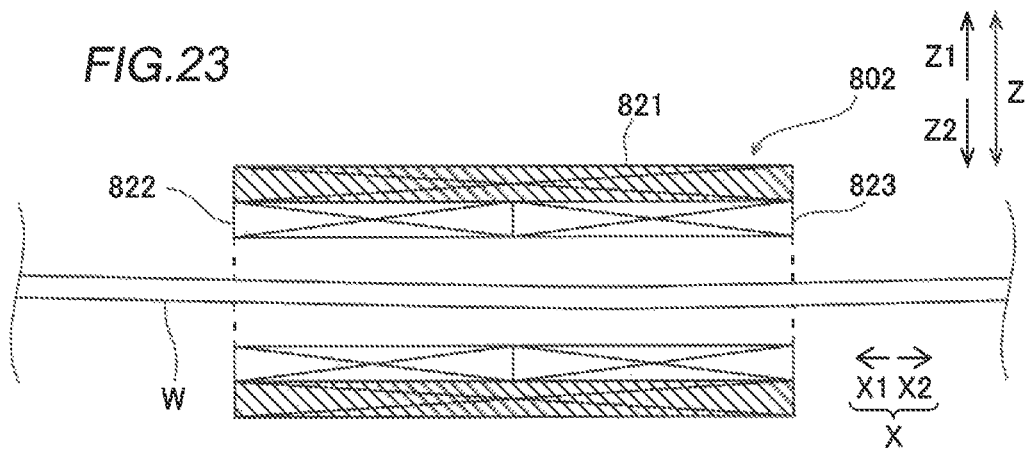
FIG. 23 is a perspective view showing the configuration of a detector according to a sixth modified example of the first and second embodiments of the present invention.

While the example in which the excitation coil and the detection coils are arranged in parallel along the longitudinal direction of the wire has been shown in each of the aforementioned first and second embodiments, the present invention is not limited to this. For example, like a detector 802 according to a sixth modified example shown in FIG. 23, an excitation coil 821 may be configured to be wound around the outer peripheral sides (arrow Z1 direction side and arrow Z2 direction side) of detection coils 822 and 823, and although not shown, the excitation coil 821 may be configured to be wound around the inner peripheral sides of the detection coils 822 and 823.

While the example in which the controller is provided in the body case to determine the state of the wire has been shown in each of the aforementioned first and second embodiments, the present invention is not limited to this. For example, the controller may not be provided in the body case, the detection signals (or the detected signals) may be transmitted from the body case to the information processor (external apparatus), and the information processor may be configured to determine the state of the wire.

While the example in which the body case is provided with the notifier configured as a lamp has been shown in each of the aforementioned first and second embodiments, the present invention is not limited to this. For example, the information processor (external apparatus) may be provided with the notifier, or the body case may be provided with a notifier configured as a speaker that notifies the determination result.

While the example in which the communicator is configured to be capable of performing wireless communication has been shown in each of the aforementioned first and second embodiments, the present invention is not limited to this. For example, the communicator may be configured to be capable of performing wired communication.

While the example in which the grip has a cylindrical shape has been shown in each of the aforementioned first and second embodiments, the present invention is not limited to this. For example, the grip may have a quadrangular prism shape.

While the example in which the grip is provided with the circuit, the notifier, the battery, the communicator, and the operation unit has been shown in each of the aforementioned first and second embodiments, the present invention is not limited to this. For example, the circuit, the notifier, the battery, the communicator, and the operation unit may be provided in the first case or the second case, or some of the circuit, the notifier, the battery, the communicator, and the operation unit may be provided in the grip, and the remaining portions may be provided in the first case or the second case.

While the example in which a magnetic field is applied in the Z direction by the magnetic field application unit has been shown in each of the aforementioned first and second embodiments, the present invention is not limited to this. That is, as long as the direction of the magnetic field applied by the magnetic field application unit is the direction that intersects with the longitudinal direction of the wire, the magnetic field application unit may be configured to apply a magnetic field to the arrow X1 direction side, the arrow X2 direction side, the arrow Y1 direction side, or the arrow Y2 direction with respect to the Z direction.

What is claimed is:

1. A magnetic body inspection apparatus comprising:
   a magnetic field application unit configured to apply, in a direction that intersects with a longitudinal direction of a long material, a magnetic field in advance to the long material including a magnetic body to be inspected, wherein the magnetic field is applied in the direction that intersects with the longitudinal direction entirely through the long material from one side of the long material in a short-side direction of the long material to another, opposite, side of the long material in a short-side direction of the long material;
   a detector configured to excite, in the longitudinal direction of the long material, magnetization of the magnetic body after the magnetic field is applied in advance by the magnetic field application unit, the detector being configured to acquire a detection signal to detect a damage to the magnetic body based on the magnetic field of the magnetic body that has been excited; and
   a detection apparatus body including the magnetic field application unit and the detector, the detection apparatus body being configured to be attachable to the long material in the short-side direction of the long material; wherein
   the detector includes a detection coil and an excitation coil which are respectively wound around the magnetic body a plurality of times along the longitudinal direction of the long material so that the magnetic body is placed inside each coil loop, the detection coil outputs the detection signal;
   wherein the magnetic field application unit includes a first magnetic field application unit arranged in a first apparatus body and a second magnetic field application unit arranged in a second apparatus body; and
   wherein the first magnetic field application unit includes a first permanent magnet arranged in only one side of the detector and a second permanent magnet arranged in only another side of the detector; and the second magnetic field application unit includes a third permanent magnet arranged in only the one side of the detector and a fourth permanent magnet arranged in only the other side of the detector.

2. The magnetic body inspection apparatus according to claim 1, wherein
   the detection apparatus body includes the first apparatus body arranged on a first side in the short-side direction of the long material and the second apparatus body arranged on a second side in the short-side direction of the long material, and is configured to open, in the short-side direction of the long material, a long material placement portion in which the long material is arranged in a state in which the first apparatus body and the second apparatus body are separate from each other, and close, in the short-side direction of the long material, the long material placement portion in a state in which the first apparatus body and the second apparatus body are coupled to each other.

3. The magnetic body inspection apparatus according to claim 2, wherein the first apparatus body and the second apparatus body of the detection apparatus body are configured to be separable from each other.

4. The magnetic body inspection apparatus according to claim 1, wherein the detection apparatus body includes a determiner configured to determine a state of the magnetic body based on the detection signal.

5. The magnetic body inspection apparatus according to claim 4, wherein the detection apparatus body includes a notifier configured to notify a determination result of the determiner.

6. The magnetic body inspection apparatus according to claim 1, wherein the detection apparatus body includes a communicator configured to transmit the detection signal or a signal based on the detection signal to an external apparatus.

7. The magnetic body inspection apparatus according to claim 1, wherein the detection apparatus body includes a grip.

8. A magnetic body inspection apparatus comprising:
a magnetic field application unit configured to apply, in a direction that intersects with a longitudinal direction of a long material, a magnetic field in advance to the long material including a magnetic body to be inspected, wherein the magnetic field is applied in the direction that intersects with the longitudinal direction entirely through the long material from one side of the long material in a short-side direction of the long material to another, opposite, side of the long material in a short-side direction of the long material;
a detector configured to excite, in the longitudinal direction of the long material, magnetization of the magnetic body after the magnetic field is applied in advance by the magnetic field application unit, the detector being configured to acquire a detection signal to detect a damage to the magnetic body based on the magnetic field of the magnetic body that has been excited; and
a detection apparatus body including the magnetic field application unit and the detector, the detection apparatus body being configured to be attachable to the long material in the short-side direction of the long material; wherein
the detector includes a detection coil and an excitation coil wound around the magnetic body along the longitudinal direction of the long material, the detection coil outputs the detection signal;
the detection apparatus body includes a first apparatus body arranged on a first side in the short-side direction of the long material and a second apparatus body arranged on a second side in the short-side direction of the long material, and is configured to open, in the short-side direction of the long material, a long material placement portion in which the long material is arranged in a state in which the first apparatus body and the second apparatus body are separate from each other, and close, in the short-side direction of the long material, the long material placement portion in a state in which the first apparatus body and the second apparatus body are coupled to each other;
the detector includes a first conductor wire arranged in the first apparatus body, and a second conductor wire arranged in the second apparatus body; and
the detection apparatus body includes a connector configured to disconnect the first conductor wire from the second conductor wire in a state in which the first apparatus body and the second apparatus body are separate from each other, the connector being configured to connect the first conductor wire to the second conductor wire in a state in which the first apparatus body and the second apparatus body are coupled to each other so as to form a coil loop centered on the long material placement portion.

* * * * *